United States Patent [19]
Heffelfinger

[11] Patent Number: 6,033,771
[45] Date of Patent: *Mar. 7, 2000

[54] WVTR FILM USING WAX IN COMBINATION WITH A CAVITATED TIE LAYER

[75] Inventor: Michael T. Heffelfinger, Westerville, Ohio

[73] Assignee: Mobil Oil Corporation, Fairfax, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/895,510

[22] Filed: Jul. 16, 1997

[51] Int. Cl.$^7$ .............................. B32B 3/26; B32B 27/32
[52] U.S. Cl. ................ 428/320.2; 428/515; 428/516; 428/484; 428/910; 264/41; 264/290.2; 264/173.14; 264/173.15
[58] Field of Search ................ 428/910, 308.4, 428/320.2, 515, 516, 484, 306.6, 307.7, 312.2; 264/290.2, 173.19, 173.14, 173.12, 173.15, 41, 45.9, 48, 49; 156/229, 244.24, 244.11, 244.15

[56] References Cited

U.S. PATENT DOCUMENTS

| | | | |
|---|---|---|---|
| 3,536,644 | 10/1970 | Frizelle et al. | 524/487 |
| 4,032,493 | 6/1977 | Pascual | 524/489 |
| 4,079,170 | 3/1978 | Cluff | 428/484 |
| 4,377,616 | 3/1983 | Ashcraft et al. | 428/213 |
| 4,442,243 | 4/1984 | Woodhams | 523/212 |
| 4,472,328 | 9/1984 | Sugimoto et al. | 264/41 |
| 4,582,753 | 4/1986 | Duncan | 428/317.9 |
| 4,663,216 | 5/1987 | Toyoda et al. | 428/212 |
| 4,666,772 | 5/1987 | Schinkel et al. | 428/330 |
| 4,692,386 | 9/1987 | Schinkel et al. | 428/515 |
| 4,705,812 | 11/1987 | Ito et al. | 521/92 |
| 4,758,462 | 7/1988 | Park et al. | 428/213 |
| 4,767,675 | 8/1988 | Cyr et al. | 428/515 |
| 4,793,956 | 12/1988 | Nogiwa et al. | 264/41 |
| 5,110,670 | 5/1992 | Janocha et al. | 428/216 |
| 5,141,801 | 8/1992 | Takeshita et al. | 428/348 |
| 5,153,074 | 10/1992 | Migliorini | 428/463 |
| 5,155,160 | 10/1992 | Yeh et al. | 524/487 |
| 5,188,777 | 2/1993 | Joesten et al. | 264/41 |
| 5,221,566 | 6/1993 | Tokoh et al. | 428/34.5 |
| 5,223,346 | 6/1993 | Lu | 428/516 |
| 5,306,533 | 4/1994 | Robichaud et al. | 428/34.2 |
| 5,346,763 | 9/1994 | Balloni et al. | 428/348 |
| 5,691,043 | 11/1997 | Keller et al. | 428/212 |
| 5,702,859 | 12/1997 | Kubota | 430/110 |

OTHER PUBLICATIONS

P.W. Atkins "Physical Chemistry", pp 874–884, 1982.

*Primary Examiner*—Paul Thibodeau
*Assistant Examiner*—D. Lawrence Tarazano
*Attorney, Agent, or Firm*—Dennis P. Santini

[57] ABSTRACT

A multi layer film having enhanced barrier properties with respect to oxygen and water vapor transmission is provided. The multi layer film includes a polyolefin core layer, a copolymer or terpolymer intermediate layer on at least one surface of the polyolefin core layer, with the intermediate layer having voids therein and including a wax trapped within the voids, and a surface layer on the intermediate layer. Multi layer films according to the present invention are particularly useful as packaging films for food products, and are successful in laminating, printing or coating operations.

11 Claims, No Drawings

WVTR FILM USING WAX IN COMBINATION WITH A CAVITATED TIE LAYER

FIELD OF THE INVENTION

The present invention relates to multi layer packaging films having enhanced barrier characteristics, and which are particularly useful as packaging films for food products, and are successful in laminating, printing or coating operations.

BACKGROUND OF THE INVENTION

Plastic materials such as polymeric films have been widely used for packaging various food and non-food products. In order to insure proper preservation of products packaged in such polymeric films, it is necessary to provide the films with barriers against transmission of air, moisture, deleterious flavors, etc. No single unmodified polymeric film, however, has sufficient gas and moisture barrier characteristics needed for proper packaging requirements. For example, polyolefin films such as polypropylene films are particularly preferred in the manufacture of packaging films due to their low cost and ease of manufacture. Such polypropylene films, however, inherently permit the transmission of oxygen and water vapor from the outside of the film to the inside of the package made up of the film. When such films are used as food packagings, oxygen and water vapor transmitted therethrough promote rapid deterioration of foods packaged therein.

In order to provide acceptable barrier properties, multi layer polymeric films have been developed having improved water vapor transmission rates (WVTR). For example, incorporating wax into film structures has been known to improve water vapor transmission rates. It is believed that the wax migrates or blooms to the outside surface of the film structure and becomes crystalline, thus imparting superior WVTR and improved oxygen barrier properties. In this approach, however, the wax on the surface is susceptible to removal, thereby presenting difficulty in maintaining such WTVR and oxygen barrier properties, particularly when such films are used in laminating, printing and coating operations.

In order to provide a film having improved barrier properties, U.S. Pat. Nos. 5,141,801 and 5,155,160 disclose incorporating a wax into a polyolefin surface layer of a co-extruded film. To prevent migration of the wax to a surface which is to be used in lamination and printing, these patents suggest incorporating a barrier layer of polymeric material such as a polyamide or an ethylene vinyl alcohol copolymer (EVOH). Such polyamide and EVOH barrier layers, however, are expensive and difficult to manufacture. Thus, while the prior art discloses various useful films, such films are typically susceptible to removal of the wax during subsequent laminating, printing and coating processes, and are difficult and expensive to manufacture.

Accordingly, a need exists for a packaging film which is simple and inexpensive to manufacture, which is capable of providing enhanced barrier properties to oxygen and water vapor transmission, and which is capable of subsequent laminating, printing or coating procedures.

SUMMARY OF THE INVENTION

It is an object of the present invention to provide a packaging film having improved oxygen and water vapor barrier properties.

It is a further object of the present invention to provide a packaging film which is efficient in laminating, printing or coating operations.

These and other objects are achieved in the present invention which provides a multi layer film having a polyolefin core layer, a copolymer or terpolymer intermediate layer on at least one surface of the polyolefin core layer, with the intermediate layer having voids therein and including a wax trapped within the voids, and a surface layer on the intermediate layer. Preferably, the polyolefin core layer and the surface layers are polypropylene. The intermediate layer is preferably an ethylene/propylene copolymer or an ethylene/butylene/propylene terpolymer, containing about 2% to about 20% of a crystalline Fischer Tropsch wax trapped within the voids therein. Most preferably, the film is a five layer biaxially oriented film having a polypropylene core layer, cavitated or voided copolymer or terpolymer intermediate layers on both surfaces of the core layer including a wax trapped within the voids thereof, and a polypropylene surface layer on both of the intermediate layers.

The present invention also provides for a method of preparing such a multilayer film, which method involves co-extruding a first polyolefin resin incorporating a wax therein, a second polyolefin resin of a copolymer or terpolymer having particles dispersed therein, and a third polyolefin resin to form a multi layer base film having a polyolefin core layer including the wax, a copolymer or terpolymer intermediate layer incorporating the particles therein on at least one surface of the polyolefin core layer and a polyolefin surface layer on the intermediate layer. The method further involves orienting the multilayer base film at conditions sufficient to cause the microparticles to form voids in the intermediate layer and to cause the wax to migrate from the polyolefin core layer into the voids of the intermediate layer.

Thus, it has been discovered herein that a multi layer film incorporating a wax within the voids of a cavitated intermediate copolymer or terpolymer layer provides excellent WVTR and oxygen barrier properties, while preventing the wax from being susceptible to removal during subsequent film laminating, printing and coating processes.

DETAILED DESCRIPTION OF THE PREFERRED EMBODIMENT

The present invention is directed to a multi layer film structure incorporating a polyolefin core layer, a copolymer or terpolymer intermediate layer having voids therein and including a wax trapped within the voids on at least one surface of the polyolefin core layer, and a surface layer on the intermediate layer. The film structure of the present invention provides excellent WVTR and oxygen barrier properties, while permitting laminating, printing and coating of the film structure without deleterious effects on the WVTR and oxygen barrier properties.

The polyolefin core layer contemplated by the present invention can be any suitable polyolefin polymer useful in the manufacture of thermoplastic films. Particularly preferred polyolefin polymers include propylene homopolymers and copolymers. Propylene homopolymers of particular use include 80–100% isotactic polypropylene, most preferably 95–96% isotactic polypropylene. Preferably, the propylene homopolymers have a melt index ranging from about 2 to about 10 grams/10 minutes and most preferably a melt index of from about 3.5 to about 6 grams/10 minutes. Preferred propylene copolymers include 98–96/2–4 propylene/ethylene copolymers, 50/50 propylene/butene-1 copolymer, 95/5 propylene/1-pentene copolymer, 90/10 propylene/1-hexene copolymer, 80/20 propylene/4-methyl-1-pentene copolymer, etc.

The film structure further includes an intermediate layer or "tie" layer on at least one surface of the core layer, with the intermediate layer being a polyolefin copolymer or terpolymer. Preferably, the intermediate layer is provided on both surfaces of the core layer. Examples of suitable polyolefin copolymers or terpolymers include without limitation ethylene-propylene (EP) copolymer and ethylene-propylene-butene-1 (EPB) terpolymer. The ratio of ethylene to propylene with an ethylene-propylene copolymer is preferably about 2–4% by weight ethylene and from about 96% to about 98% by weight polypropylene, while the ratio of ethylene to propylene to butene-1 for ethylene-propylene-butene-1 terpolymer is preferably from about 0–15% ethylene, 70–100% propylene and 0–15% butene-1.

The intermediate layer includes voids therein, commonly referred to as "cavitations", thus providing a voided or cavitated film layer. Incorporating voided or cavitated layers into multi layer film structures is known in the art, for instance, as described in U.S. Pat. No. 4,377,616 to Ashcraft et al., incorporated herein by reference. Typically, such voids are formed by incorporating void-initiating particals or particulate material into the resin which forms the film layer. By including such particulate material in the resin, the film layer is formed including the particulate material dispersed throughout the layer. Upon orientation of the layer, the dispersed particulate material causes a strata of voids to form at the location of the particulate material, as will be discussed in more detail herein. Such voids typically impart a high degree of opacity to the film.

The void-initiating particles can be any material which is capable of forming voids in the intermediate layer without causing degradation to the film material, such as those materials described in U.S. Pat. No. 4,337,616. Preferably, the void-initiating particals are thermoplastic resins with a higher melting point than the polymer of the intermediate layer. Examples of preferred materials include polyamides, nylons, polyesters, acrylic resins, etc. Most preferably, the void-initiating material is polybutylene terephthalate (PBT). Preferably, the PBT is incorporated into the resin which forms the intermediate layer, as will be discussed in more detail herein, in an amount of about 4–15%, most preferably about 6–10%.

In the present invention, a crystalline wax is incorporated into the multi layer film. During manufacture of the film, the wax migrates into the voids in the intermediate layer, where it is concentrated. The wax imparts superior WVTR and improved oxygen barrier properties to the film. The wax is preferably a hydrocarbon wax, such as a mineral wax or a synthetic wax. More preferably, the wax is a polyethylene or polypropylene wax. Particularly preferred waxes are waxes prepared according to the Fischer-Tropsch process, commonly referred to as Fischer Tropsch waxes, preferably having an average molecular weight of about 640 and a melting point of about 80° C.

The wax is initially incorporated into the core layer, and migrates into the voids of the intermediate layer during preparation and orientation of the film, as will be discussed in more detail herein. In prior art techniques incorporating wax in a film structure, all of the wax easily migrates or blooms to the surface, where it is subject to removal by wiping or subsequent processing of the film. The voids in the intermediate layer provide an internal surface area to contain or trap the wax within the film structure, thus preventing all of the wax from blooming to the surface of the film.

The amount of wax incorporated into the film structure depends on the thickness of the overall film structure as well as the type of polyolefin layers. The wax is preferably present in an amount of about 2% to about 20%, more preferably between about 6% and about 12%, and most preferably about 12%. Amounts in excess of about 20% tend to produce film structures which are weak.

As noted above, the intermediate layer is a cavitated or voided polyolefin copolymer or terpolymer. It is believed that a unique synergy exists between the trapped wax and the copolymer or terpolymer voided intermediate layer. This synergy is believed to be due to the enhanced solubility of the wax in the copolymer or terpolymer and the high difflusion rate of the wax in this layer. This permits the wax to diffuse to the internal surface of the voids, creating a high density layer at the void walls.

The film structure of the present invention further includes a surface layer or "skin" layer on the intermediate layer. When the intermediate layer is provided on both surfaces of the core layer, surface layers are preferably provided on both of said intermediate layers. Preferably, the surface layer is a polyolefin layer. Useful polyolefins contemplated by the present invention include any suitable polyolefin polymer useful in the manufacture of thermoplastic films. Preferred polyolefin polymers include high density polyethylene, propylene homopolymers and copolymers, such as those described above as being useful as the core layer, as well as terpolymers. It should be noted that when PBT is used as a cavitating agent for the intermediate layer in amounts greater than about 9%, it is preferable that the surface layer adjacent the intermediate layer be one of a higher melt index polyolefin, such as polypropylene homopolymer having a melt index of from about 7–10 grams/10 minutes.

The use of cavitated or voided surface layers is also contemplated by the present invention. In particularly preferred embodiments, the surface layer includes a propylene copolymer or terpolymer. While such copolymers and terpolymers are believed to assist in allowing a portion of the wax to bloom to the surface of the film structure, the voided intermediate layer is believed to contain a majority of the wax within the voids of the intermediate layer, thereby maintaining the barrier properties of the film structure.

The films of the present invention are preferably 0.5 to 1.25 mils in thickness, with the core layer preferably representing about 52–88 percent of the total thickness, the intermediate layers preferably representing about 2–12 percent per side of the total thickness, and the surface layers preferably representing about 4–12 percent per side of the total thickness.

The film of the present invention can be clear or opaque. Preferably, the film is opaque, with such opacity attributed to the cavitated nature of the intermediate layer.

Preferably, the moisture barrier or water vapor barrier of the present inventive film is below a transmission rate of 0.25 grams per 100 square inches per day, at conditions of 100° F. temperature and ambient relative humidity, and most preferably below a transmission rate of 0.2 grams per 100 square inches per day.

The multi layer film structure of the present invention is preferably a coextruded film wherein different resins form specific layers of the film structure. The present invention also relates to a method of producing a multi layer oriented film structure having excellent barrier properties against the transmission of oxygen and water vapor. In the method, three polyolefin resins are co-extruded to provided a multi layer base film structure having film layers corresponding to the polyolefin resins. The first polyolefin resin is a core layer-forming resin which provides for the polyolefin core layer which, as noted above, is preferably a propylene homopolymer or copolymer. The crystalline wax is blended or incorporated into the core layer-forming polyolefin resin.

The second polyolefin resin is an intermediate layer-forming resin which provides for the intermediate layer. As discussed, the intermediate layer is a polyolefin copolymer or terpolymer having voids therein. As such, the intermediate layer-forming resin includes void-initiating particals or particulate material incorporated therein.

The third polyolefin resin is a surface layer-forming resin which provides for the polyolefin surface layer or skin layer, preferably a propylene homopolymer, copolymer or terpolymer.

The three polyolefin resins are coextruded to form a multi layer base film structure having a core layer incorporating a wax therein, an intermediate layer incorporating void-initiating particles therein on at least one surface of the core layer, and a surface layer on the intermediate layer. Preferably, the three polyolefin resins are coextruded to form a five layer base film structure having a core layer incorporating a wax therein, an intermediate layer incorporating void-initiating particles therein on both surfaces of the core layer, and surface layers on both intermediate layers.

The multi layer base film structure thus formed represents a transitional or interim product, which is then subjected to orientation to produce a multi layer oriented film product. Orientation of such extruded base films is well known in the art, and results in improved physical properties of the composite layers such as flex-cracking resistance, Elmendorff tear strength, elongation, tensile strength, impact strength and cold strength properties. In addition to these improved physical properties, in the present invention, orientation of the multi layer base film structure provides for both cavitation of the intermediate layer as well as migration of the wax into the cavitations or voids.

In particular, orientation of the multi layer base film structure is conducted at orientation conditions such that the void-initiating particles in the intermediate layer create voids within the structure of the intermediate layer, as described in the incorporated U.S. Pat. No. 4,377,616. Preferably, the film is biaxially oriented 4–6 times in the machine direction and 7–12 times in the transverse direction, more preferably 4–5 times in the machine direction and 8–10 times in the transverse direction. Further, orientation of the multi layer base film structure is conducted at conditions which cause the wax incorporated into the core layer to become mobile, thereby causing the wax to flow or migrate. Preferably, orientation of the film is conducted at a temperature of approximately 100° C. to 160° C.

Since the intermediate layer is present on the surface of the wax-containing core layer, and the orientation of the film causes the voids to form within the intermediate layer as well as causes the wax within the core layer to become fluid and mobile within the film structure, the mobile wax migrates from the core layer into the voids created within the intermediate layer. As the oriented film cools, the mobile wax crystallizes within the voids of the intermediate layer, where it is in effect "trapped" within the multi layer film structure. Thus, the wax is prevented from migrating entirely to the surface of the film. It is contemplated that a portion of the wax remains within the core layer of the film structure.

Films manufactured according to the present invention have excellent WVTR and oxygen barrier properties, which properties are less susceptible to damage by removal of the wax from the surface as compared with prior art films. As such, the films of the present invention are useful in subsequent laminating, printing and coating techniques while retaining their WVTR and oxygen barrier properties.

The invention may be further understood with reference to the following non-limiting examples.

EXAMPLE 1

Example 1, representing a comparative example, demonstrates the effects of incorporating wax into the core of a five layer film structure having a polypropylene homopolymer core layer, polypropylene homopolymer intermediate layers on each surface of the core layer, and polypropylene homopolymer surface layers on each of the intermediate layers.

A polypropylene homopolymer resin was blended with 4.5% of a Fischer Tropsch wax having a melting point of 80° C. This polypropylene/wax resin blend was co-extruded with two additional polypropylene homopolymer resins, to form a five layer base film structure having a polypropylene homopolymer core layer incorporating 4.5% wax therein, polypropylene homopolymer intermediate layers on both surfaces of the core layer, and polypropylene homopolymer surface layers on both of the intermediate layers. The five layer base film structure was biaxially oriented 4–5 times in the machine direction and 8–10 times in the transverse direction, to produce a clear five layer film product.

The five layer film product was aged in a hot room at 120° F. and ambient humidity for a period of 72 hours, and tested for water vapor transmission according to ASTM method F124–90 and oxygen transmission according to ASTM method D3985–81.

The five layer film had a poor water vapor transmission rate of 0.30 g/100 in$^2$/day, and a poor oxygen transmission of 70 cc/100 in$^2$/day.

EXAMPLE 2

Example 2, representing a comparative example, demonstrates the effects of incorporating wax into the core of a three layer film structure having a polypropylene homopolymer core and including non-cavitated terpolymer surface layers.

A polypropylene homopolymer resin was blended with 4.5% of a Fischer Tropsch wax having a melting point of 80° C. as in Example 1. This propylene/wax resin blend was co-extruded with a terpolymer resin including an ethylene/butylene/propylene terpolymer, to form a three layer base film intermediate structure having a polypropylene homopolymer core layer incorporating 4.5% wax therein, ethylene/butalene/propylene terpolymer surface layers on both of the intermediate layers. The three layer base film intermediate structure was biaxially oriented 4–5 times in the machine direction and 8–10 times in the transverse direction, to produce a clear three layer film product.

The three layer film product was aged in a hot room at 120° F. and ambient humidity for a period of 72 hours, and tested for water vapor transmission according to ASTM method F124–90 and oxygen transmission according to ASTM method D3985–81.

The three layer film had an excellent water vapor transmission rate of 0.08 g/100 in$^2$/day, and a good oxygen transmission of 37.3 cc/100 in$^2$/day. Most of the wax, however, bloomed to the surface of the film, and was vulnerable to wiping, thereby increasing the water vapor transmission and oxygen transmission, and decreasing the barrier properties.

EXAMPLE 3

Example 3 represents a comparative example wherein the intermediate layer is a cavitated polypropylene homopolymer rather than a cavitated copolymer or terpolymer, and demonstrates the effects of incorporating wax into the core of a five layer film structure having a polypropylene homopolymer core layer, a cavitated polypropylene homopolymer intermediate layer on both surfaces of the core layer, and a polypropylene homopolymer surface layer on each of the intermediate layers.

A polypropylene homopolymer resin was blended with 4.5% of a Fischer Tropsch wax having a melting point of 80° C. A second polypropylene homopolymer was blended with 6% polybutylene terephthalate (PBT) as a void-initiating material. These two resin blends were co-extruded with a third polypropylene homopolymer resin, to form a five layer base film intermediate structure having a polypropylene homopolymer core layer incorporating 4.5% wax therein, polypropylene homopolymer intermediate layers incorporating 6% PBT on both surfaces of the core layer, and polypropylene homopolymer surface layers on both of the intermediate layers. The five layer base film intermediate structure was biaxially oriented 4–5 times in the machine direction and 8–10 times in the transverse direction. The orientation of the film produced voids in the intermediate layer, and caused the wax in the core layer to become mobile and migrate into the voids in the intermediate layer wherein it crystallized. Thus, an opaque five layer film product having a cavitated or voided intermediate layer including a wax trapped within the voids.

The five layer film product was aged in a hot room at 120° F. and ambient humidity for a period of 72 hours, and tested for water vapor transmission according to ASTM method F124–90 and oxygen transmission according to ASTM method D3985–81.

The five layer film had a poor water vapor transmission rate of 0.35 g/100 in$^2$/day, and a poor oxygen transmission of 112.1 cc/100 in$^2$/day.

EXAMPLES 4 & 5

Examples 4 and 5 represent films manufactured according to the present invention, thus demonstrating the effects of incorporating wax into the core of a five layer film structure having a polypropylene homopolymer core layer, a cavitated ethyelene/propylene copolymer or ethylene/butylene/propylene terpolymer intermediate layer on both surfaces of the core layer, and a polypropylene homopolymer surface layer on each of the intermediate layers.

In Example 4, a polypropylene homopolymer resin was blended with 4.5% of a Fischer Tropsch wax having a melting point of 80° C. An ethylene/propylene copolymer was blended with 6% polybutylene terephthalate (PBT) as a void-initiating material. These two resin blends were co-extruded with a third polypropylene homopolymer resin, to form a five layer base film intermediate structure having a polypropylene homopolymer core layer incorporating 4.5% wax therein, ethylene/propylene copolymer intermediate layers incorporating 6% PBT on both surfaces of the core layer, and polypropylene homopolymer surface layers on both of the intermediate layers. The five layer base film intermediate structure was biaxially oriented 4–5 times in the machine direction and 8–10 times in the transverse direction. The orientation of the film produced voids in the intermediate layer, and caused the wax in the core layer to become mobile and migrate into the voids in the intermediate layer wherein it crystallized. Thus, an opaque five layer film product having a cavitated or voided intermediate layer including a wax trapped within the voids was formed.

In Example 5, a film was prepared as in Example 4, with the exception that an ethylene/butylene/propylene terpolymer was substituted for the ethylene/propylene copolymer of the intermediate layers. Thus, an opaque five layer film product having cavitated or voided intermediate layers of ethylene/butylene/propylene terpolymer including a wax trapped within the voids was formed.

The five layer film products of Examples 4 and 5 were aged in a hot room at 120° F. and ambient humidity for a period of 72 hours, and tested for water vapor transmission according to ASTM method F124–90 and oxygen transmission according to ASTM method D3985–81.

The five layer film of Example 4 had a good water vapor transmission rate of 0.22 g/100 in$^2$/day, and a good oxygen transmission of 69.1 cc/100 in$^2$/day. The five layer film of Example 5 had a good water vapor transmission rate of 0.20 g/100 in$^2$/day, and a good oxygen transmission of 62.6 cc/100 in$^2$/day.

A comparison of Examples 4 and 5 with Example 1 demonstrates the improved barrier to water vapor transmission and oxygen transmission by incorporating a cavitated intermediate layer into the film structure. A comparison of Examples 4 and 5 with Example 2 demonstrates the importance of a cavitated intermediate layer, in that the film of Example 2 possessed excellent barrier properties, but the wax was easily susceptible to removal by wiping of the surface. A comparison of Examples 4 and 5 with Example 3 demonstrates the benefits of using a cavitated copolymer or terpolymer as the intermediate layer as compared with a cavitated homopolymer as the intermediate layer, with improved WVTR and oxygen permeability properties achieved with the cavitated copolyer or terpolymer intermediate layers.

EXAMPLES 6–11

Examples 6–11 demonstrate the improved water vapor transmission rate and oxygen barrier properties obtained by incorporating increased amounts of wax into the core of a five layer film structure having a polypropylene homopolymer core layer, a cavitated ethylene/propylene copolymer or ethylene/butylene/propylene terpolymer intermediate layer on both surfaces of the core layer, and a polypropylene homopolymer surface layer on each of the intermediate layers, as in the present invention.

In Examples 6, 7 and 8, polypropylene homopolymer resins were blended with 6%, 9% and 12%, respectively, of a Fischer Tropsch wax having a melting point of 80° C. An ethylene/propylene copolymer was blended with 10% polybutylene terephthalate (PBT) as a void-initiating material. The polypropylene homopolymer/wax resins were individually coextruded with the ethylene/propylene copolymer and a third polypropylene homopolymer resin having a melt index of 9 grams/10 minutes, to form three (3) separate five layer base film intermediate structures having a polypropylene homopolymer core layer incorporating, respectively, 6%, 9% and 12% wax therein, ethylene/propylene copolymer intermediate layers incorporating 10% PBT on both surfaces of the core layer, and polypropylene homopolymer surface layers on both of the intermediate layers. Each of the five layer base film intermediate structures were biaxially oriented 4–5 times in the machine direction and 8–10 times in the transverse direction. The orientation of the films produced voids in the intermediate layers, and caused the wax in the core layers to become mobile and migrate into the voids in the intermediate layers wherein it crystallized. Thus, three opaque five layer film products having cavitated or voided intermediate layers including a wax trapped within the voids were formed.

In Example 9, 10 and 11, three films were prepared as in Example 6, 7 and 8, with the exception that an ethylene/butylene/propylene terpolymer was substituted for the ethylene/propylene copolymer of the intermediate layers. Thus, three opaque five layer film products having cavitated or voided intermediate layers of ethylene/butylene/propylene terpolymer including a wax trapped within the voids were formed.

The five layer film products of Examples 6–11 were aged in a hot room at 120° F. and ambient humidity for a period of 72 hours, and tested for water vapor transmission according to ASTM method F124–90 and oxygen transmission according to ASTM method D3985–81. The results of the tests are shown in Table A.

| Example # | % Wax in Core | WVTR (g/100 in$^2$/day) | Oxygen Transmission (cc/100 in$^2$/day) |
| --- | --- | --- | --- |
| 6 | 6% | 0.13 | 24.1 |
| 7 | 9% | 0.077 | 22 |
| 8 | 12% | 0.057 | 19 |
| 9 | 6% | 0.17 | 20.7 |
| 10 | 9% | 0.15 | 23.8 |
| 11 | 12% | 0.057 | 19 |

As is evident from the results in Table A, each of the five layer films of Examples 6–11 had excellent water vapor transmission rates and oxygen transmission rates. Furthermore, a comparison of Examples 6, 7 and 8, representing increased levels of wax with a cavitated copolymer intermediate layer, as well as a comparison of Examples 9, 10 and 11, representing increased levels of wax with a cavitated terpolymer intermediate layer, demonstrate that improved water vapor transmission and oxygen barrier properties are achieved with increased levels of wax. Furthermore, the water vapor transmission rate remains at an acceptable level after wiping of the surface of the film, suggesting that the wax is trapped within the voids of the intermediate layer.

While the invention has been thus described in terms of specific embodiments, those skilled in the art will recognize that various modifications and variations can be made without departing from the spirit and scope of this invention. Such modifications and variations are considered to be within the purview and scope of the appended claims.

What is claimed is:

1. A multilayer oriented film comprising:
   a polyolefin layer including solubilized wax blended therein which under conditions of film orientation undergoes flow,
   a copolymer or terpolymer intermediate layer on at least one surface of said polyolefin layer, said intermediate layer having voids therein and including a wax trapped within said voids, and
   a surface layer on said intermediate layer,
   wherein when said multilayer oriented film is biaxially oriented, a portion of said solubilized wax migrates from said polyolefin layer into said voids of said intermediate layer and crystallizes therein.

2. A multilayer oriented film as in claim 1, wherein said polyolefin layer is polypropylene.

3. A multilayer oriented film as in claim 1, wherein said wax is a Fischer Tropsch wax.

4. A multilayer oriented film as in claim 1, wherein said wax is present in an amount of about 2% to about 20% of said film.

5. A multilayer oriented film as in claim 1, wherein said intermediate layer is ethylene/propylene copolymer.

6. A multilayer oriented film as in claim 1, wherein said intermediate layer is ethylene/butylene/propylene terpolymer.

7. A multilayer oriented film as in claim 1, wherein said surface layer is selected from the group consisting of polyolefin homopolymers, copolymers and terpolymers.

8. A five layer film comprising:
   a polypropylene homopolymer core layer including solubilized wax blended therein,
   copolymer or terpolymer intermediate layers on both surfaces of said polypropylene core layer, said intermediate layers having voids therein and including a wax trapped within said voids, and
   polypropylene homopolymer surface layers on both of said intermediate layers,
   wherein when said film is biaxially oriented, a portion of said wax migrates from said polypropylene homopolymer core layer into said voids of said intermediate layers.

9. A multilayer oriented film having barrier properties comprising a film structure formed by a process comprising:
   providing a first polyolefin resin incorporating a solubilized wax blended therein, a second polyolefin resin comprising a copolymer or terpolymer resin having particles dispersed therein, and a third polyolefin resin;
   co-extruding said first polyolefin resin, said second polyolefin resin and said third polyolefin resin to form a multilayer base film having a polyolefin core layer including said wax, a copolymer or terpolymer intermediate layer incorporating said particles therein on at least one surface of said polyolefin core layer and a polyolefin surface layer on said intermediate layer; and
   biaxially orienting said multilayer base film at conditions sufficient to cause voids formed around said particles in said intermediate layer and to cause a portion of said wax to migrate from said polyolefin core layer into said voids of said intermediate layer.

10. A method of forming a multilayer oriented film having barrier properties comprising the steps of:
    forming said film by co-extruding a composition comprising a first polyolefin resin, which includes a blended wax solubilized therein, a second polyolefin resin comprising a copolymer or terpolymer resin having particles dispersed therein, and a third polyolefin resin;
    biaxially orienting said film at conditions sufficient to cause voids around said particles in said intermediate layer and to cause a portion of said wax to migrate from said first polyolefin resin into said voids of said intermediate layer.

11. The method of claim 10 further including cooling said film to crystallize out and trap said migrated wax with said voids.

* * * * *